United States Patent
Cocanougher, Jr.

(10) Patent No.: US 11,878,445 B2
(45) Date of Patent: Jan. 23, 2024

(54) UNITARY BOAT HULL AND METHODS OF MANUFACTURE

(71) Applicant: Robert Allen Cocanougher, Jr., North Richland Hills, TX (US)

(72) Inventor: Robert Allen Cocanougher, Jr., North Richland Hills, TX (US)

(*) Notice: Subject to any disclaimer, the term of this patent is extended or adjusted under 35 U.S.C. 154(b) by 0 days.

(21) Appl. No.: 18/177,669

(22) Filed: Mar. 2, 2023

(65) Prior Publication Data

US 2023/0278267 A1 Sep. 7, 2023

Related U.S. Application Data

(60) Provisional application No. 63/268,801, filed on Mar. 3, 2022.

(51) Int. Cl.
| | | |
|---|---|---|
| *B29C 41/20* | (2006.01) | |
| *B29C 33/40* | (2006.01) | |
| *B63B 3/09* | (2006.01) | |
| *B29C 41/00* | (2006.01) | |
| *B29K 309/08* | (2006.01) | |
| *B29L 31/30* | (2006.01) | |

(52) U.S. Cl.
CPC ............... *B29C 41/20* (2013.01); *B29C 33/40* (2013.01); *B29C 41/003* (2013.01); *B63B 3/09* (2013.01); *B29K 2309/08* (2013.01); *B29L 2031/307* (2013.01)

(58) Field of Classification Search
CPC .... B63B 3/00; B63B 3/02; B63B 3/09; B29C 33/40; B29C 41/003; B29C 41/20; B29K 2309/08; B29L 2031/307
USPC ........................................ 114/343, 355, 357
See application file for complete search history.

(56) References Cited

U.S. PATENT DOCUMENTS 4,118,814 A * 10/1978 Holtom ................. B29C 66/547
264/137
2005/0011425 A1 1/2005 Suh

FOREIGN PATENT DOCUMENTS

| EP | 0875447 A1 | 11/1998 |
| TW | 201708042 A | 3/2017 |
| WO | WO/2017/219058 A1 | 12/2017 |

OTHER PUBLICATIONS

International Search Report issued in International Application No. PCT/US2023/063607 dated Aug. 9, 2023.

* cited by examiner

*Primary Examiner* — Daniel V Venne
(74) *Attorney, Agent, or Firm* — Vos-IP, LLC

(57) ABSTRACT

A method of manufacturing a boat hull comprising: forming a foam mold of a predetermined shape and size from one or more pieces of foam; cutting, into said foam, at least one-channel running in a longitudinal or a lateral direction within the foam; and coating said foam with at least one layer of reinforcing fiber and resin.

19 Claims, 9 Drawing Sheets

UNITARY BOAT HULL AND METHODS OF MANUFACTURE

CROSS-REFERENCE TO RELATED APPLICATIONS

This application claims the benefit of U.S. Provisional Patent Application No. 63/268,801 filed on Mar. 3, 2022, with the United States Patent and Trademark Office, the contents of which are incorporated herein by reference in their entirety.

FIELD OF THE INVENTION

The present disclosure is related to boat hulls and more particularly towards a boat hull constructed around a foam core, and methods of manufacturing the same.

BACKGROUND OF THE INVENTION

Boats have been in use for thousands of years. Early construction methods included those such as hide, log, sewn, lashed-plank, clinker, and reverse-clinker. Skin boats utilized a wooden or bone frame and stretched skins, such as leather and hide, over the frame. Such boats included kayaks, umiaks, coracles, and currachs, as well as other styles. In certain areas, bark was stretched over wooden frames, instead of the skin. Dugout boats were made in areas where trees grew large enough to support such structure and carving out a hollow portion in a single portion of wood. Rafts, such as those made of bound timber or made from papyrus were quite common and are still made in this way for primitive vessels.

Larger vessels continued to be developed using a shell-first construction technique. These included the sewn and lashed-plank, clinker and reverse-clinker, and mortise-and-tenon joints. The sewn and lashed-plank, where planks of wood are sewn together with rope. The seams can then be sealed with tar, sap, fats, and other materials that were available in the location. Clinker and reverse-clinker construction used overlapping layers of planks, instead of lashing them together. Finally, a mortise-and-tenon join was also used to secure planks together in some regions.

More modernly, a frame-first construction is used where the framework is first created and then attaching planks or steel to create the shell. This was normally done by erecting a master frame in the center of the keel and deriving the shapes of the other frames using a curved piece of wood stretched between the frame and the end posts.

Fiberglass boat building has created even lighter watercrafts. Typically, the boat is built with an internal structure and then sheathed with a hull. In many cases, a mold of the hull is made, and fiberglass and resin are applied into the mold, wherein after the fiberglass has dried, the completed shell is simply lifted out of the mold. This creates a stable shape, but the shape is not adjustable. Thus, for any different size hull, a separate mold is created. Such construction limits flexibility and requires significant costs and space for different molds, where different size hulls are desired.

New techniques are required to provide ship builders with a nimble approach towards building watercraft, specifically those which are able to be uniquely modified and which also include different structural elements than prior building approaches, and which generate a craft of superior strength.

SUMMARY OF THE INVENTION

This manufacturing process is revolutionary in that it creates a product with a much higher level of customization and flexibility than what has been previously provided by the traditional mold confined boat making process. Furthermore, because the cloth and resin are virtually always in contact with the foam backing, increased strength is provided to the materials. This generates a hull of superior strength and which can be selectively created with various densities of foam to modify the properties of the hull as desired.

In a preferred embodiment, a method of manufacturing a boat hull comprising: (a) forming a foam mold of a predetermined shape and size from one or more pieces of foam; (b) cutting, into said foam mold, at least one C-channel running in a longitudinal or a lateral direction within the foam; and (c) coating said foam mold with at least one layer of reinforcing fiber and resin.

In a further embodiment, the method wherein said foam mold comprises at least two pieces of foam. In a further embodiment, the method wherein the at least two pieces of foam comprise a first piece of foam of a first density and a second piece of foam of a second density. In a further embodiment, the method wherein at least one piece of foam comprises at least two different densities of foam, wherein a higher density foam is positioned below a lower density foam.

In a further embodiment, the method wherein said at least one C-channel runs in a longitudinal axis in the foam and extends between 5% and 90% of the length of the foam.

In a further embodiment, the method comprising at least two C-channels, each running in a longitudinal axis.

In a further embodiment, the method wherein said at least one C-channel has a depth of between 1 mm and 100 mm, and wherein said reinforcing fiber is positioned within the C-channel and in direct contact with the foam within said C-channel.

In a further embodiment, the method wherein the at least two C-channels run substantially parallel to one another.

In a further embodiment, the method wherein the at least one C-channel comprises a tube, a pipe, a wire, or a structural element, running at least a portion of the length of the C-channel. In a further embodiment, the method wherein a conduit provides a passage between a first point in said boat hull and a second point in said boat hull.

In a further embodiment, the method further comprising a through hole positioned within said foam.

In a further embodiment, the method comprising a first piece of foam and a first through hole and a second piece of foam and a second through hole, wherein said first and second through holes are oriented to align said first and second pieces of foam to allow continuous connection between said first and second through holes.

In a further embodiment, the method wherein said first through hole and said second through hole have the same diameter. In a further embodiment, the method wherein the first and second through holes are adjoined with an insertable element, connecting and securing said first and second pieces of foam together. In a further embodiment, the method wherein said insertable element comprises a passage therethrough to maintain passage between said first and second through holes.

In a further embodiment, the method comprising a plurality of pieces of foam, each piece of foam comprising at least one adjacent piece of foam; wherein a connection pair of holes is defined to secure each at least one adjacent piece of foam to another. In a further embodiment, the method wherein the connection pair of holes is defined so that each pair has a unique diameter or a unique shape so as to form a unique pair as compared to all other connection pairs of holes.

In a further embodiment, the method further comprising a higher density foam positioned below a lower density of foam within the foam mold.

In a further embodiment, the method further comprising a transom, said transom utilizing a higher density of foam than an adjacent foam.

In a further embodiment, the method wherein said reinforcing fiber is a woven or nonwoven fiber of natural or synthetic materials and includes but is not limited to: E-Glass and S-Glass or R-Glass, carbon fiber, biaxial fibers, triaxial fibers, unidirectional fibers, aramid fibers, and combinations thereof, which is compatible with one or more resins. In a further embodiment, the method wherein the one or more resins are selected from the group consisting of: polyester, vinyl ester, epoxy resin, and combinations thereof.

In a preferred embodiment, a boat hull comprising: (a) a foam core comprising one or more pieces of foam; (b) at least one C-channel defined along a longitudinal or lateral axis of the foam core; and (c) a reinforcing fiber and a cured resin, said reinforcing fiber and cured resin substantially in contact with the foam core and filling said at least one C-channel with reinforcing fiber and cured resin to create a nonplanar reinforcing fiber component.

In a further embodiment, the boat hull wherein said foam core comprises at least two separate pieces of foam. In a further embodiment, the boat hull wherein the at least two separate pieces of foam are connected together by an adhesive at a seam. In a further embodiment, the boat hull wherein the at least two separate pieces of foam each comprise a recess on a face of each of the at least two separate pieces of foam, said recesses forming an opposing pair, and a connecting rod insertable into said recesses.

In a further embodiment, the boat hull comprising at least one hole passing through said foam core.

In a further embodiment, the boat hull further comprising a conduit within said C-channel.

In a further embodiment, the boat hull further comprising a layered piece of foam wherein said layered piece of foam comprises at least two distinct densities of foam layered adjacent to one another.

In a preferred embodiment, a method of manufacturing a boat hull comprising: (a) forming a foam mold of a predetermined shape and size from one or more pieces of foam; (b) cutting into said foam mold at least one C-channel running in a longitudinal or lateral direction within the foam; and (c) coating said foam mold with at least one layer of reinforcing fiber and resin.

In a further embodiment, the method wherein said foam mold comprises at least two pieces of foam.

In a further embodiment, the method wherein the at least two pieces of foam comprise a first piece of foam of a first density and a second piece of foam of a second density.

In a further embodiment, the method wherein at least one piece of foam comprises at least two different densities of foam wherein a higher density foam is positioned below a lower density foam.

In a further embodiment, the method wherein said at least one C-channel runs in a longitudinal axis in the foam and extends between 5% and 90% of the length of the foam.

In a further embodiment, the method comprising at least two C-channels, each running in a longitudinal axis. In a further embodiment, the method wherein said at least one C-channel has a depth of between 1 mm and 100 mm and wherein said reinforcing fiber is positioned within the C-channel and in direct contact with the foam within said C-channel. In a further embodiment, the method wherein the at least two C-channels run substantially parallel to one another.

In a further embodiment, the method wherein the at least one C-channel comprises a tube, a pipe, a wire, or a structural element running along at least a portion of the length of the C-channel.

In a further embodiment, the method further comprising a through hole positioned within said foam.

In a further embodiment, the method wherein a conduit provides a passage between a first point in said boat hull and a second point in said boat hull and preferably wherein the conduit is positioned within a through hole within said foam.

In a further embodiment, the method comprising a first piece of foam and a first aligned recess and a second piece of foam and a second aligned recess, wherein said first and second aligned recesses are oriented to align said first and second pieces of foam by inserting an alignment member within said first and second aligned recesses.

In a further embodiment, the method wherein the first and second aligned recesses are first and second through holes, said through holes providing continuous connection between said first and second through holes. In a further embodiment, the method wherein said first through hole and said second through hole have the same diameter. In a further embodiment, the method wherein the first and second through holes are adjoined with an alignment member connecting and securing said first and second pieces of foam together.

In a further embodiment, the method wherein said alignment member comprises a passage therethrough to maintain passage between said first and second through holes.

In a further embodiment, the method comprising a plurality of pieces of foam, each piece of foam comprising at least one adjacent piece of foam; wherein a connection pair of holes is defined to secure each at least one adjacent piece of foam to another; and wherein an alignment member is positioned between each adjacent piece of foam. In a further embodiment, the method wherein the connection pair of holes is defined so that each pair has a unique diameter or a unique shape so as to form a unique pair as compared to all other connection pairs of holes.

In a further embodiment, the method further comprising a higher density foam positioned below a lower density foam within the foam mold.

In a further embodiment, the method further comprising a transom, said transom utilizing a higher density foam than an adjacent foam.

In a further embodiment, the method wherein said reinforcing fiber is a woven or nonwoven fiber of natural or synthetic materials and includes but is not limited to: E-Glass and S-Glass or R-Glass, carbon fiber, biaxial fibers, triaxial fibers, unidirectional fibers, aramid fibers, and combinations thereof; wherein said reinforcing fiber is compatible with one or more resins, said one or more resins selected from the group consisting of: polyester, vinyl ester, epoxy resin, and combinations thereof.

In a further embodiment, the method wherein a first piece of foam and a second piece of foam are adjoined using a lap joint.

In a further embodiment, the method wherein a seam created between a face on a first piece of foam and a second face on a second piece of foam comprises a recess at an edge of the face and the second face along the length of the seam.

In a preferred embodiment, a method of manufacturing a boat hull comprising: (a) forming a foam mold of a predetermined shape and size from at least a first piece of foam and a second piece of foam, each comprising at least one face for being adjoined together; (b) securing said first and second pieces of foam with an alignment member, said alignment member being positioned within a first hole in said first piece of foam and a second hole in said second piece of foam, said first and said second holes positioned on opposing faces being adjoined; (c) coating said foam mold with at least one layer of reinforcing fiber and resin; and optionally performing one or more of the following steps before coating: (i) cutting into said foam mold at least one C-channel running in a longitudinal or lateral direction within the foam; and/or (ii) placing a hose or wire within the first or second hole; and/or (iii) the alignment member being hollow; and/or (iv) the first or second piece of foam comprising at least two different densities of foam; and/or (v) a top core material being positioned above a seam between the first and second pieces of foam; and/or (vi) a recess being positioned along each of the adjoining faces; and/or (vii) a hose or wire being provided within a C-channel.

In a preferred embodiment, a boat hull comprising: (a) a foam core comprising one or more pieces of foam; (b) at least one C-channel defined along a longitudinal or lateral axis of the foam core; and (c) a reinforcing fiber and a cured resin, said reinforcing fiber and cured resin substantially in contact with the foam core and filling said at least one C-channel with reinforcing fiber and cured resin to create a nonplanar reinforcing fiber component.

In a further embodiment, the boat hull wherein said foam core comprises at least two separate pieces of foam. In a further embodiment, the boat hull wherein the at least two separate pieces of foam are connected together by an adhesive at a seam.

In a further embodiment, the boat hull wherein the at least two separate pieces of foam each comprise a recess on a face of each of the at least two separate pieces of foam, said recesses forming an opposing pair, and an alignment member insertable into said recesses.

In a further embodiment, the boat hull comprising at least one hole passing through said foam core, and optionally further comprising a conduit within said C-channel or a wire.

In a further embodiment, the boat hull further comprising a layered piece of foam wherein said layered piece of foam comprises at least two distinct densities of foam layered adjacent to one another.

In a preferred embodiment, a boat hull comprising: (a) a foam core, said foam core comprising at least a first piece of foam and a second piece of foam; (b) at least one alignment member positioned between said first and second pieces of foam; (c) a C-channel positioned on a face of at least one of the first and second piece of foam; (d) at least one of a conduit, a tube, a hose, or a wire positioned within the C-channel; and (e) at least one layer of fiber impregnated with resin, said at least one layer of fiber impregnated with resin suitable for covering the foam core.

In a further embodiment, the boat hull wherein the C-channel comprises a structural element positioned therewithin.

There is no competing modern process of building boats that will be able to match the flexibility, design, structure, flotation, and integrity while matching the scalability this design represents.

DETAILED DESCRIPTION OF THE INVENTION

Figure 1:
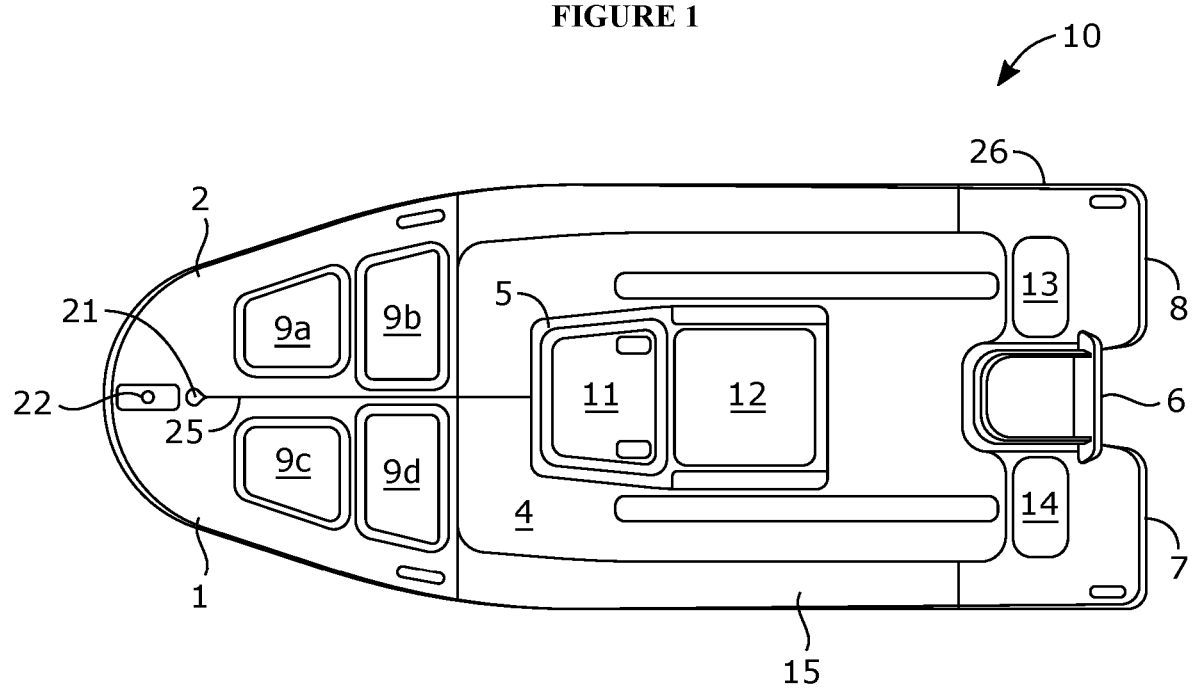
FIG. 1 depicts a top plan view of a boat hull.

The present disclosure details new construction methods and processes to generate such structures that will create both a better design and function of existing watercrafts by addressing several fundamental flaws in the way that watercraft are traditionally constructed. Boats utilize a hull structure to provide for a lightweight, strong, buoyant, and water-resistant structure. Such construction may be suitable not only to boat construction, but also towards other watercraft, trailers, and other types of construction that utilize reinforcement cloth and resin to create structure.

In the traditional stringer system, there are numerous parts of the hull that have no backing. Think of it like the outer skin of an airplane sitting over the skeleton of that plane. This poses a problem, for the strength over the span (the span being the distance between stringers), and the strength of the fiberglass over that distance. The present disclosure details a completely different process than the prior art and begins by creating a base blank (foam core) that will serve as the functional support structure to which will utilize lamination schedule which is structurally stronger than laminates without a composite backing. Thus, the present disclosure details a structure and building method where the foam core is continuous and thus there are virtually no areas that do not contain backing support of the foam for the reinforcing fiber and resin. Such areas without a backing create weaknesses in the structure that is therefore absent in the manufacture under the present embodiments.

The key to the improvement is that the base blank, or foam core provides a continuous backing for the deposit of a reinforcement fiber and resin. This structure ensures that all portions of the reinforcement fiber contain a backing, which is stronger than the reinforcement fiber without a backing. Therefore, the improved process yields an increased structure with greater strength than existing construction techniques that are impacted by the issue of strength over the span between the stringers in typical existing construction methods. In certain embodiments, the functional support structure blank is air permeable. When applying the fiber and resin, the permeable layer may eliminate or reduce the formation of air bubbles, which, in ordinary construction is an imperfection that decreases strength.

The embodiments of the present disclosure will also fix the traditional manufacturing of watercraft by: (1) greatly reducing the use of unskilled labor involved in traditional boat building processes; (2) building boats in mass where the hull/structure of the boat is not derived from a traditional mold; and (3) having the flexibility of making multiple minimal or substantial changes to the shape, beam, dead rise, layout, length, weight, center of gravity, etc. without remanufacturing an existing mold or simply manufacturing a new or additional mold.

Boats made under the present disclosure have significant advantages over the prior at in that the present disclosure construction yields: (1) a boat that can be fire proof/resistant unlike prior art builds; (2) a boat that may not require a bilge; (3) a boat that may utilize masses of materials to generate a positive upright floatation, as the foam has positive flotation on its own; (4) a boat that will have the capability of being submerged; and (5) a boat that can have the capability of being self-righting based on choices of materials in the hull. Furthermore, this manufacturing technique uniquely lends itself to always meeting coastguard requirements for foam flotation regardless of size of vessel. And finally, this process does away with the necessity for boat molds, stringer molds, and top cap molds required by traditional processes.

A key issue in design of a prior art boat hull is that such designs are not traditionally tested before the first models come out. It is a fundamentally flawed process in which a boat is designed and a mold is created for the hull without testing of the final product. However, the manufacture of a mold is expensive and, once constructed, takes up significant space for both use and storage. This has traditionally required boat manufacturers to maintain shops that are just massive for storing these molds. For a single model of a boat there is a top cap in addition to the hull mold, both of which are larger than the boat itself. On top of this there is also the stringer mold all of which must be stored inside and maintained. This means to build a 25-foot boat there is the boat itself plus two other 25+ foot pieces and at least a 12+ foot stringer system. Accordingly, significant space is required to manufacture a single boat under prior art designs. This compounds as manufacturers expand their model lineup and is one of the greatest limiting factors in growth of a manufacturer to additional size or shaped boats.

To use the prior art mold in construction, the mold is covered with fiberglass or other fiber material, the fiber/cloth is coated with a resin and then dried or cured. Thus, the boats are typically built outside in, with the traditional first step with either the hull mold or the top cap mold including spraying a gel coat, typically an isophthalic resin, which has both good water resistance as well as fatigue properties. Following that gel coal layer, certain layers, whether for aesthetics or structure are added, including the foundational layup of multiple layers of fiberglass that are backed by a stringer system. This allows for the gelcoat to be in the female mold and removed, once the resin and other layers are dried. In certain instances, pigments and designs can be included in the gel coat or in the other layers. Once dried, the fiberglass is separated, typically by lifting the fiberglass from the mold to then be used in construction of the vessel. A significant constraint of this construction process is that once a mold is created it can only be modified in a very limited way and many design improvements in a line of boats require the manufacture of new molds. Accordingly, where a mold must be substantially modified, the mold is essentially wasted, and the time and money that went into the original mold construction are lost. Even in making a new mold, it remains at risk of the same issues, namely the requirement or desire to modify the mold.

However, the present disclosure begins with a completely different structural system, one that starts with a foam core that is made up of one or more machined pieces of one or more densities of foam. This foam core will provide the backing shape and some structural support to a composite lamination schedule applied to both the inside and the outside of the hull. Additionally cuts, channels, ridges and other surface features will be routed into the foam core before or after the multiple pieces of foam are pieced together giving shape to the hull. The shapes cut into the foam may include ridges, cuts, channels, recesses, etc., and will provide structure to the outer layer of glass giving the boat additional structural support. The structure can be both supportive and also functional, wherein in some instances, recesses are utilized for other components of the boat or for finishes of the final boat.

As detailed in FIG. 1, the embodiments herein detail a construction process that utilizes a foam core, whether from a single piece of foam or multiple pieces of foam that are connected together. Accordingly, FIG. 1 details a top plan view of a boat hull (10) comprised of one or more pieces of foam. In unibody construction, meaning a solid portion of foam in one or more pieces, a CNC machine or other cutting tool or machine is utilized to cut the shapes of the various components into the foam. Thus, a large single block of foam would be carefully cut to create the shape and various elements of the hull on both an external face and also the internal faces of the foam. However, it may be advantageous to machine the various components in several different pieces, and to then secure those pieces together forming a solid foam core. Those of ordinary skill in the art recognize that foam is readily secured to another piece of foam via an adhesive or a number of different resin materials. Thus, as depicted, multiple pieces of foam may include the starboard bow (2), the port bow (1), which would be combined together along the bow seam (25). Within the bow portion, several features are machined into the foam, including the box block (22), a bow hole (21), as well as the structural hatches (9a, 9b, 9c, and 9d).

The foam core further comprises, at the central portion of the hull, the aft floor (15), and directly in the center portion the forward floor (4), the cockpit (5), and the forward cockpit reservoir (11) and rear cockpit reservoir (12). To the rear is the port sponson (7) and starboard sponson (8), the lower stern (26), the rear port hatch (14) and the rear starboard hatch (13) can be machined into the lower stern (26). The transom (6) is positioned at the rear. These components are formed of foam typically as different pieces, and once combined together, are then ready to be covered with a reinforcing fiber and resin. The reinforcing fiber and resin is the key structural component to the build, and when placed over the foam, creates a structure having high strength. As with any build, an exterior layer can include various reinforcing fibers impregnated with resins that have high waterproofing properties while also having greater resistance to abrasion than other materials. Together, the foam and the fiber reinforced material and resin layers create a stronger hull than prior construction methods.

These fiber reinforced materials possess good strength properties as well as water repellency. Accordingly, they are useful in providing exterior and interior surfaces in watercraft, but also in construction that requires strong but lightweight construction and where waterproofing is desirable. When using resins for structural reinforcement with fibers, different resins have different properties and thus each has a different purpose in the boat construction world. Certain materials have different stretch characteristics or strength or adhere better to one material over another. Polyester resins are the most common resin used in modern boat building. Polyester is inexpensive and generally works well with most materials. It does not stretch or elongate and so is inapposite for construction where such properties are needed. Most commonly, the polyester uses an orthophthalic base, but others may include isophthalic bases. Isophthalic resins are more resistant to water and chemicals and are slightly more abrasion resistant and also have a higher impact and flex performance. For example, a "gel coat" is often made using an isophthalic resin.

Vinyl ester resins have better stretch characteristics than polyesters, and thus can be used with a greater variety of reinforcing materials. It is typically more expensive than polyester materials, but it also has superior bonding strength as compared to polyesters. For this reason, stringers and bulkheads added to a cured hull may use a vinyl ester for bonding these areas instead of the polyester. In certain embodiments, blends of resin materials may be utilized in order to meet a particular structural goal for the boat built.

Epoxies are excellent at adhering to a wide variety of materials, and thus are the best choice in many cases for attaching cores, stringers, or other items. However, they can be difficult to work with based on some having a thick consistency and are often much more expensive than either the polyester or vinyl ester resins.

Each of the resins can be utilized with different reinforcing fibers, which are typically woven or nonwoven fibers. Woven fabrics using continuous strands are quite common and have weights typically from 1 ounce to 50 ounces, though both lighter and heavier weights exist, with 4 to 20 ounces per square yard as a common weight for building purposes. Heavier weight may also include untwisted yarns, and may have course finishes, as compared to smooth and clean finishes for lighter weight fibers. The cloth creates structure and strong bidirectional strength. The particular fiber may be natural, synthetic, or a combination of the two fibers and come in a variety of weave patterns.

Certain reinforcing fibers include E-Glass and S-Glass types of fiberglass cloth. E-glass is a common fiberglass cloth made from molten plastic spun into fine fibers, which are woven or nonwoven materials. S-Glass or R-Glass (names used interchangeably) by comparison is much more expensive, but has higher tensile, impact and flexural strength than E-Glass.

Other types of reinforcing fibers may include, but are not limited to: biaxial fibers, triaxial fibers, unidirectional fibers, as well as carbon fiber materials may also be used. Other exotic materials may include aramid fibers, which are known under several tradenames including Kevlar® and Nomex®.

Figure 2:
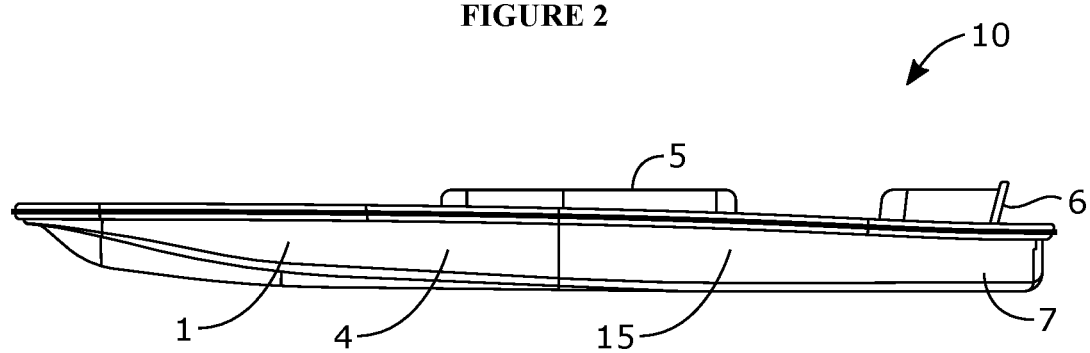
FIG. 2 depicts a left side view of a boat hull.

FIG. 2 depicts an example of a boat hull from the left side, again depicting the port bow (1) the forward floor (4), the aft floor (15), and port sponson (7) as well as the cockpit (5) and transom (6). Each of these pieces could again be individual foam pieces and combined together, or several elements formed on one or more pieces of foam. Thus, the port bow (1) and the forward floor (4) could be one piece or made from two or more pieces. The particular design of FIG. 2 is a nonlimiting example of the shape, style and components in a boat design, provided to merely describe and depict one possible construction. The same exists for additional drawings of the example boats in FIGS. 3-5.

Figure 3:
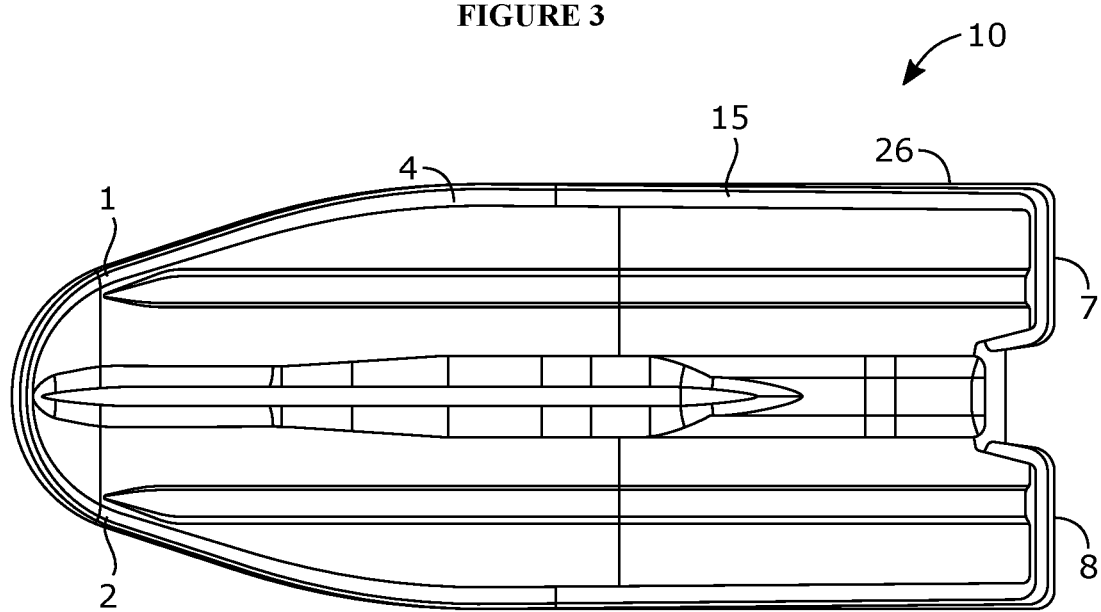
FIG. 3 depicts a bottom view of a boat hull.
Figure 4:
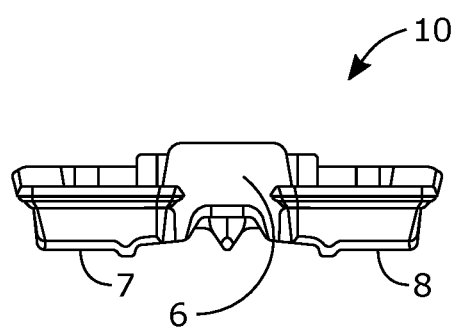
FIG. 4 depicts a rear view of a boat hull.

FIG. 3 then depicts the hull from the bottom, depicting the starboard bow (2), the port bow (1), the forward floor (4), and aft floor (15), the lower stern (26) and the starboard sponson (8) and the port sponson (7). Finally, the rear shot specifically depicts the port sponson (7) and the starboard sponson (8). FIG. 4 details the hull from the rear, depicting the port sponson (7), the transom (6), and the starboard sponson (8).

Figure 5:
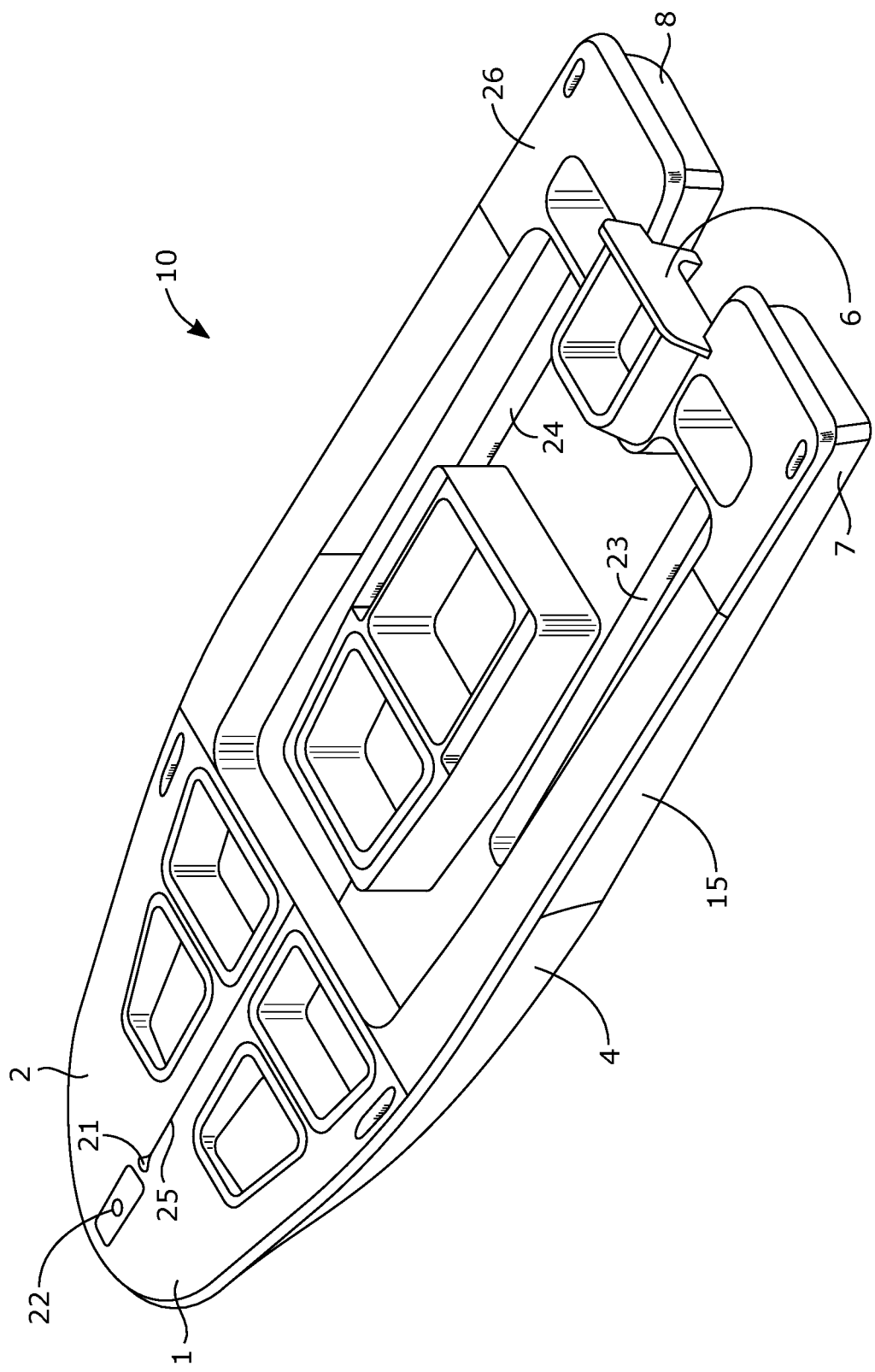
FIG. 5 depicts a top perspective view of a boat hull.

FIG. 5 provides a perspective view and depicts the port machined recess (23) on the left side and the starboard machined recess (24). These recesses are machined into the foam and can be filled in a number of ways. Their precise placement in the foam can be modified to any location wherein it may be necessary or desirable to adding strength to the reinforcing fiber structure, or to run any wiring, cords, hoses, or other elements that are useful to be hidden within the foam core itself, including at any edges or seams. Any recess is simply a recess within the foam having at depth of at least 1 mm. Preferably, the depth is between 1 mm and 1,000 mm, and more preferably, the depth is between about 1 mm and 100 mm. However, the exact depth is not so limited. The recess can then have reinforcing fiber filled into the recess, which creates a shape for the reinforcing fiber, or laminated over the recess, leaving the recess unfilled, or partially filled.

In typical construction of a hull, a stringer or support beam is often critical to the stability and structural integrity of the vessel. This is because there is a required strength over span, in order to allow the structure to support the mass and impacts. The stringer is a portion of material that runs from the bow to the stern, or a majority of the distance between those points on the hull. The present embodiment has a structural foam backing and does not have the gaps left in a traditional stringer system, and thus the strength over span problems are not present in the present embodiment. Therefore, the typical stringer system is not required in the present embodiments. However, it may be advantageous to build in a support structure that can be added into the foam core, either through fiber and resin or placing such a structure within a recess. In certain embodiments, a recess alone, when filled with fiber and resin becomes a support structure, or through the use of composites, tubes, or other materials that can be glassed into the foam for creating additional structural strength. Thus, structural elements, if they are utilized, are built into the foam, which is directly different that the prior art, which forms the structure first and builds around it.

Accordingly, in preferred embodiments, there are a plurality of recesses in the foam, which can be filled with a stringer element, e.g., a natural material, a composite material, a plastic, a fiber, resin, or combinations of these components. Thus, a stringer element may be inserted into a recess or a recess may be simply filled with resin/cloth to create structural elements within the void. Once the material is placed within a recess, the recess is covered or filled by a fiberglass or epoxy resin, and preferably with one or more layers of a fiber. In preferred embodiments, a single layer of fiber is utilized, and sufficient structural integrity is created through the use of only this single layer of fiber and resin, when combined with the filling of the recesses. The goal is to create one layer, where we can create enough rigidity with just one layer, which removes much of the work and labor for the many layers of normal boat building. However, multiple layers of fiber may also be utilized, without limitation. Indeed, a portion of the design and structural integrity is that the inclusion of various recesses positioned along the longitudinal axis (length of the boat) as well as the lateral axis (width of the boat) and even in the z-axis (height of the boat), gives structural integrity that is not present in prior art manufacturing. It is the inclusion of supporting structural elements along these direct axes, as well as between such axes (i.e., in a lateral and z-direction) or having a longitudinal and lateral bend (something extending from the bow to the stern and traversing from the port to the starboard side) also provides such varying structural integrity within the build. This is in direct contrast to the use of spraying randomized fibers with a resin on current protocol building methods that can leave weak spots with the structure because of lack of material or alignment or misalignment of randomized fibers.

In the present embodiments, the design is most preferably stringerless as would be understood in present boat building structure but can incorporate certain structural elements along any axis, but usually, if included, are within the longitudinal or lateral axis of the boat. In prior art structures, the stringers provide for strength over a span, which is not required by the present construction methods. Instead, the present disclosure utilizes certain recesses within the foam to create structural element in the reinforcing fiber. It is easiest to describe the structural elements of the reinforcing fiber as being a C-shape or a box shape structure, instead of planar reinforcing fiber. The C-shape is structurally stronger than a flat plane. The strength of the reinforcing fiber will be generated by machining into the hull itself, one or more channels, for example, longitudinal channels that will be filled with fiberglass and resin to provide strength without a traditional stringer or separate support. Simply creating a C-channel in the foam form will add a substantial amount of strength to the reinforcement fiber once it cures and takes on the shape of the recess, namely forming the C-shaped channel.

Figure 10:
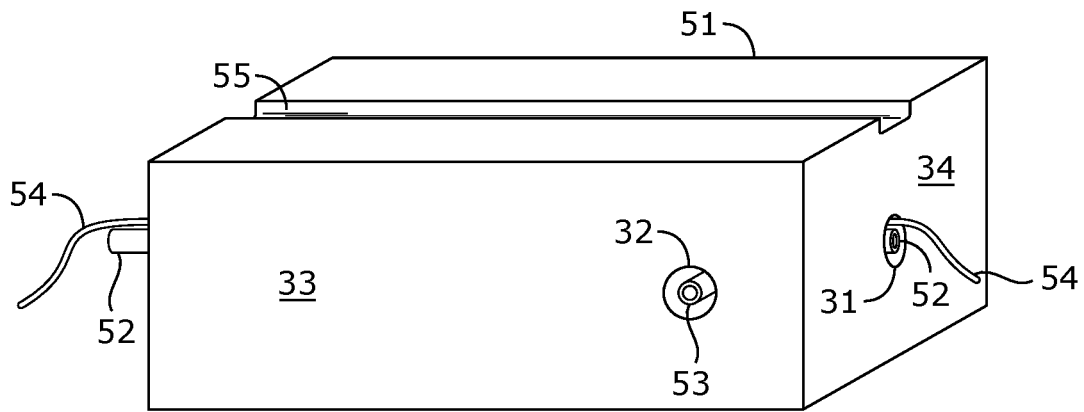
FIG. 10 depicts a channel and a length of a material within the channel.
Figure 11:
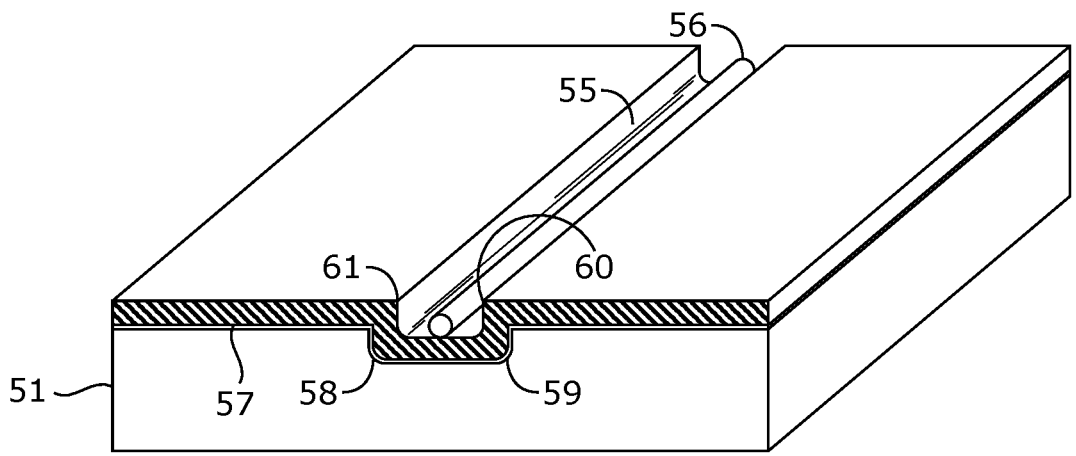
FIG. 11 depicts a channel with a reinforcement fiber and a component within the channel.
Figure 12:
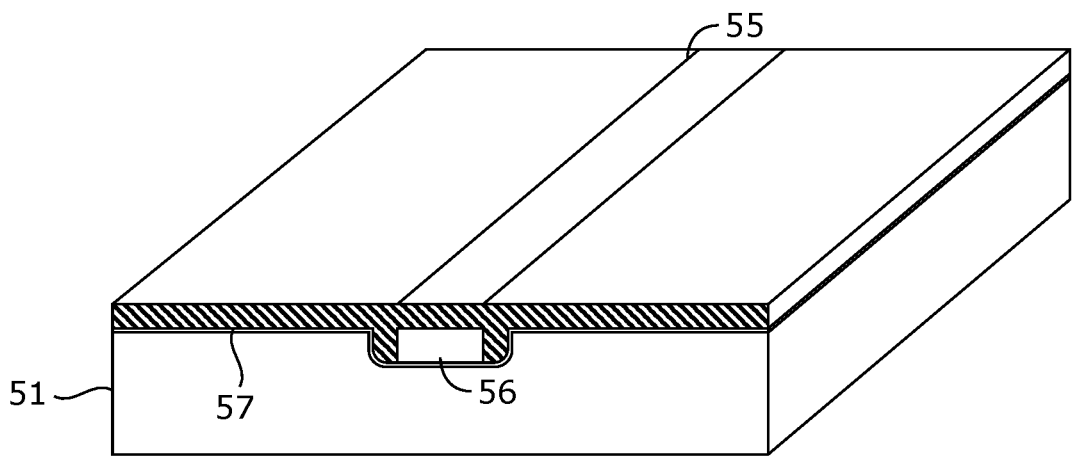
FIG. 12 depicts a further embodiment of FIG. 11.

FIGS. 10-12 provide further details of a channel within the foam core, where a recess (55) functions to force the reinforcing fiber (57) to create a curve or comprise a series of angles, e.g., left bottom corner (58), right bottom corner (59), right lip (60), and left lip (61). This yields a C-shaped structure for the reinforcement fiber (57). Those of skill in the art will recognize that use of such structural elements such as the C-shape, generate significant improvements in the strength of the material, as compared to a planar material, for example if the reinforcing fiber (57) was simply laid flat over the recess (55). Thus, when the reinforcing fiber (57) is cured with a resin within a C-shaped channel, substantial strength gains are afforded as compared to a planar fiber.

FIG. 10 details a first example of a C-channel (55), being cut into the top of the foam block (51). The foam block (51) has sides (33 and 34) and includes holes (31 and 32) in the different sides (33 and 34) of the foam block (51). Within the holes are disposed conduits (52 or 53), and also depicting the running of a wire (54) through the opening allowing for running of the same along the length of the foam (51). Like the recess (55) and as further detailed below, such tubular structure (52 or 53) can be of any shape or size, to add structure or to simply aid in the running of wires, or a connection tube for transfer of fluids, etc. Tubular structure (52) is depicted as extending through the entire length of the foam (51). This confirms that holes (31 and 32) may be through holes, that is, they are passages to allow for conduit (52 or 53) or wire (54) to pass through the passage.

FIG. 11 details the channel and the laying of at least one layer of reinforcement fiber and resin. Notably, the channel (55) defines a left lip (61) a left bottom corner (58), a right bottom corner (59) and a right lip (60). These features form the C-shaped channel within the foam block (51). When the reinforcement fiber is laid into the C-channel (55), the reinforcement fiber then takes on the shape of the C-channel (55). This forces the reinforcement fiber (57) from a planar structure, to one that comprises a bend. As detailed in FIG. 11, this produces two side walls and a bottom, within the bottom of the C-channel (55). Within the C-channel can be disposed a conduit (56). FIG. 11 also depicts the optional presence of a tubular support (56) within the recess (55). Thus, the recess can be filled with an optional tubular support (56) in addition to the reinforcing fiber (57). The tubular support (56) can be solid or hollow. Where it is hollow, additional wires or further hoses or pipes can be run within the hollow portion of the tubular support (56). Alternatively, the tubular support (56) can simply be a nonsupporting hose or wire or other material the is desirous to run within the recess (55) to cleanly run these materials from one portion of the boat to another.

Within any conduit run within the C-channel (55) or in any passage hole, can be run any number of materials, whether it is a wire, or hose or a structural element. Indeed, the conduit can serve many purposes and allow for elegant and simple running of these elements from one portion of the boat to another.

FIG. 12 details a further embodiment, wherein within the C-channel (55) is a structural element (56). The structural element (56) can be a hollow or solid material of any shape or size, that is, inserted into the C-channel (55). This still allows for the reinforcement fiber (57) to create the C-shape of the channel (55), but a further layer of reinforcement fiber (57) may also be included over the structural element (56). Alternatively, the structural element (56) may simply be secured with additional resin, filling the cavity of the channel (55). Those of ordinary skill in the art will recognize the various different densities of fillers and resins, as well as reinforcing fibers (57) that can be utilized to secure and create an elegant finish to such structure.

In addition to the recess being filled with the reinforcing fiber (57), FIG. 12 depicts that the recess can also be filled with a further support structure (56), for example balsa, another wood, a composite, a metal, or simply filled with fiber and a resin, or combinations of these. For example, a preferred embodiment utilizes a composite support structure (56) that is then secured into place using a resin and reinforcing fiber to fill any remaining openings and to seal the feature from the elements. Such an embodiment is depicted by FIG. 12, where the foam core (51) contains a recess (55) includes a support structure (56) within the recess (55), and the reinforcing fiber (57) is then filled over or under or around the support structure (56). This creates a C-shape for the reinforcing fiber, or several C-shapes, as well as secures the support structure (56). As with FIG. 11, the support structure (56) may be solid or hollow, and where it is hollow, may be used to run hoses or cordage or wires within said hollow portion of the support structure (56).

Recesses throughout the design, with or without an interior tube, can be utilized to run electrical, other cables or hoses between the cockpit (5) and the transom (6), or along any length of the hull where a recess is provided. For example, further recesses can be machined into the bow portion, for example the machined seam or stringer (25) that is positioned at the seam between the port bow (1) and the starboard bow (2). This would allow for running electrical from the cockpit (5) to the bow of the hull, whether for integration of ordinary lights, speakers, other powered accessories, etc.

Figure 6:
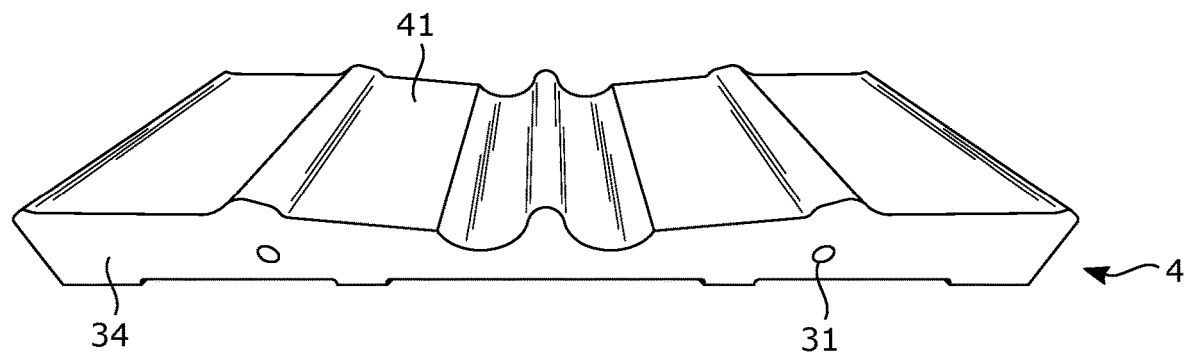
FIG. 6 depicts a bottom view of a portion of the forward floor.

The complete structure of a hull requires several components to create a watertight and buoyant structure. When several pieces of foam are utilized, certain embodiments may increase the strength of the seams between the various foam pieces, as well as align the different foam pieces to ensure a clean fit. Such clean fit will reduce the need for further sanding or machining of the combined pieces, specifically at the seam between two or more pieces. The single foam material or multiple pieces of machined foam are further detailed in FIGS. 6, 7A, 8, and 9. FIG. 6 details a machined forward floor (4), with a bottom surface (41) and an inner surface (34). Machined on the inner surface (34) is a hole (31a or 31b). The hole (31a or 31b) is utilized to improve the securing of an attaching foam piece to this machined forward floor (4). In preferred embodiments, the hole (31a or 31b) has a depth of between 1/16 of an inch and at the greatest depth the hole is actually a tunnel that extends all the way through the material. Preferable holes that do not extend, have a length that extends about 90% of the length of the material or less. Thus a 10-foot length of foam would have a hole of 9 feet or less.

However, it is preferable that the hole is a tunnel, meaning it has both an entrance and an exit. Such tunnels serve several purposes. First, they are utilized to run wiring or hoses through the foam and allow for seamless integration of these components. Second, they are filled with an alignment member, nonlimiting examples being: a rod, a tube, a dowel, or other similar component to align and provide the passage, with fiber and resin or combinations thereof. Preferably, an adjoining block of foam has a corresponding hole or tunnel that aligns specifically together. When adjoining pieces that do not require a tunnel, the hole is preferably between 1/4 inch and 6 inches in depth, and allows for easy joining of the two pieces with an alignment member (insertable element), such as any of the dowel, tube, rod, etc.

In such a way, the components can be easily organized to create a clean fit and alignment of the surfaces of each of the two pieces of foam. Certainly, two or more holes and alignment rods can be utilized in making the connection. In certain embodiments, an alignment member placed in hole (31a or 31b) would only match up with a corresponding hole with the specific corresponding piece of foam that it is supposed to attach to. For example, the hole (31a) may have a specific diameter, which is different from the diameter of another hole (31b) in another location. This would then allow only selective positioning of pieces together, as only one piece would actually fit with the respective corresponding holes (31a and 31b). Alternatively, as opposed to different sizes, the different holes (31a and 31b) could also use a different shape. Similarly, the different holes (31a and 31b) could have a different depth, as one could be a tunnel and the other having a shorter depth for alignment and adjoining purposes only.

Accordingly, in addition to the recesses (55), holes (31 and 32) provide another significant feature unique to this process which is the creation of hollow structural elements for running wires or hoses that can traverse the longitudinal and lateral axis of the build or both. Indeed, in such hollow recesses, the hollow recess may be advantageously filled with wiring, hoses, structural elements, fibers, resins, or combinations thereof. This provides for an elegant solution to run wiring, to run hoses, and to include such within the hollow recesses created through the manufacturing process.

This allows for a clean way to hide these components and to encapsulate them within the structure of the boat.

Figure 7A:
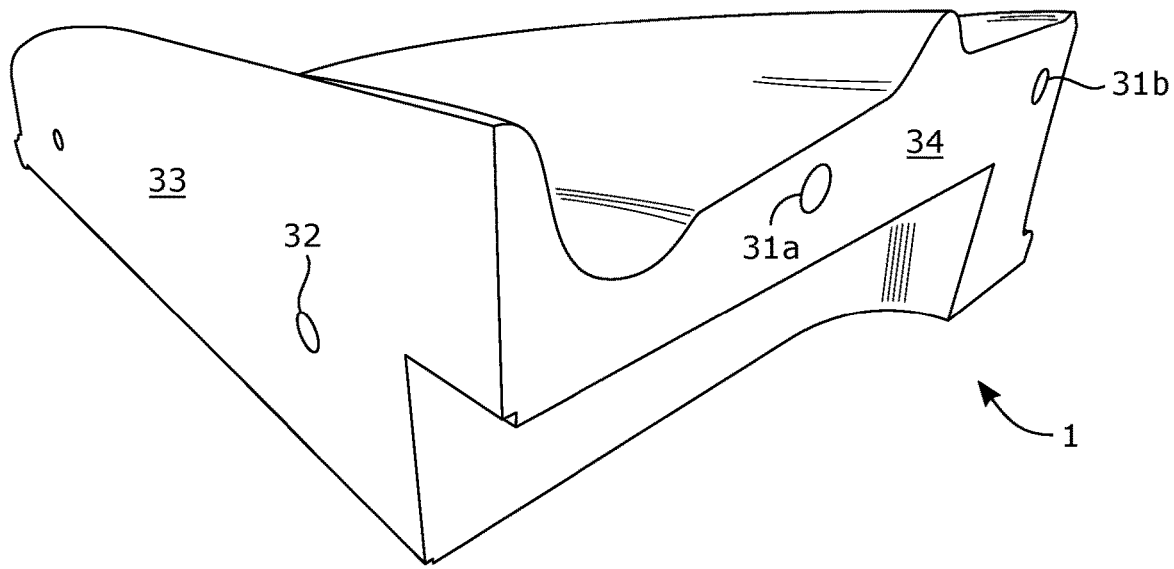
FIG. 7A depicts a bottom perspective view of a portion of the bow.

FIG. 7A details a port bow (1) section of foam, with an inner surface (34) and a side surface (33) and depicting to holes (31a and 31b) along the inner surface (34) and at least one latitudinally oriented hole (32) along the side surface (33). Thus, such configuration shows that a second cut foam piece can be attached to the inner surface (34) and a second piece to the side surface (33). Or a single piece of foam can be cut that fits the orientation and angle to attach to both the inner surface (34) and the lower stern (26).

Figure 8:
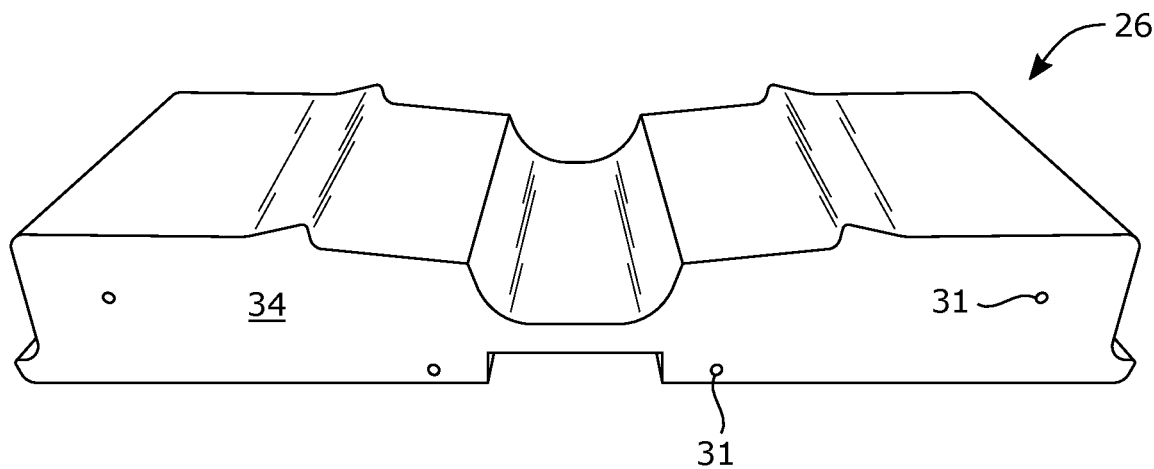
FIG. 8 depicts a bottom view of a portion of the hull.

FIG. 8 depicts a portion of the stern (26) with several holes (31) on the inner surface (34). In both FIGS. 6 and 8, the width of the foam spans the entire width of the hull. Accordingly, additional pieces of foam would secure to the inner surfaces (34) but would not be added to a side surface (33) as that side surface is the outer surface of the hull.

Figure 9:
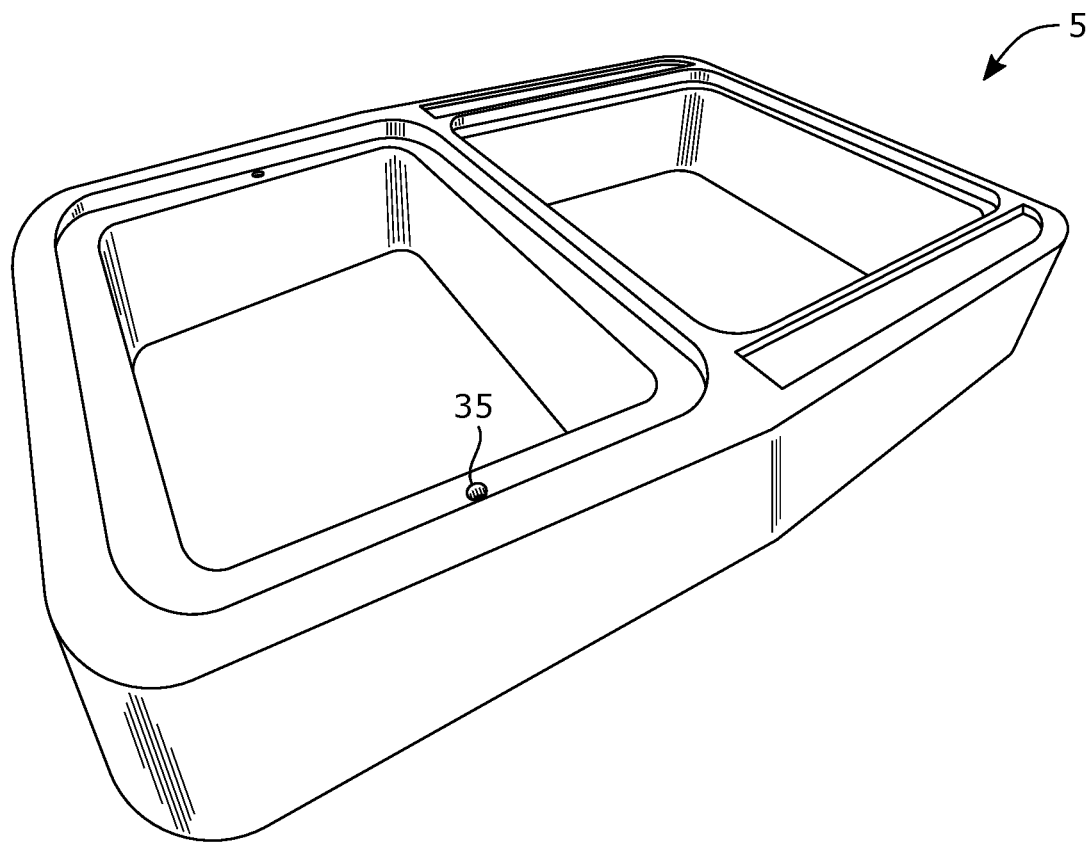
FIG. 9 depicts a top view of a portion of the cockpit.

FIG. 9 details a portion of the cockpit (5) and depicts vertical holes (35) positioned along the feature. This is because the cockpit (5) is secured above an adjoining piece of foam. Thus, the cockpit itself can also function as a top core (104). See FIG. 7G, where it overlaps seams made between foam pieces below the cockpit. Furthermore, the various vertical holes (35) may specifically again be a hole or a tunnel, with wiring or tubing being connected therein to adjoin to other areas within the hull.

There are a number of reasons to use different foam sections as compared to a single unitary piece. The first being size. Simply put, with large vessels, a very large cutting (or milling, or other machine that can modify the foam block) machine would be needed to cut a single block of foam. Instead, smaller blocks being adjoined can be cut with a much smaller machine and then adjoined. Another key reason to use different foams is the use of different weight or different density foams in different sections of the hull, for example, using the same or multiple densities of foam that drives the performance characteristics of the boat. Different densities of foams can be used in different locations, based on the requirement for the location. For example, the transom (6) where motor mounts, could be made from 24-pound foam while the rest of the material could be 6-pound foam above the waterline, and 12-24-pound foam below the waterline. By creating higher densities below the waterline, the boat can become self-righting. Essentially, the heavier foam creates the appropriate ballast weight to force the hull to self-adjust its position. In certain applications, this is highly desirable. Additionally, a more rigid, or a more flexible, or stronger foam can be used to make one part of the boat stronger or more flexible than another location. The weight of foams is not limited by this disclosure, and therefore any known or suitable foam weight is suitable for use in these embodiments.

Figure 13:
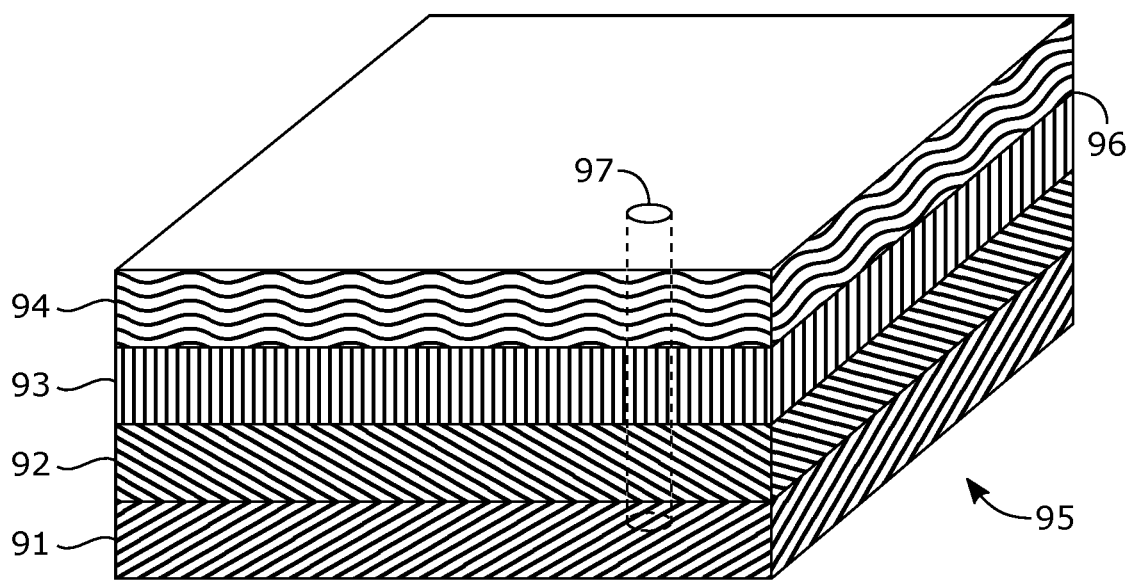
FIG. 13 depicts an embodiment in which different densities of foam are stacked to create a multi-density foam block.

Furthermore, different densities of foam can be stacked to create a multi-density foam block (95). As depicted in FIG. 13, this would allow for slices of foam, e.g., foam layers (91, 92, 93, and 94) to be utilized with a heavier weight foam at the bottom of the boat, and lighter weights being stacked onto. Thus, if the bottom of the boat was (81), then it would likely have a greater weight or density than foam layer (94) which is stacked above it. Optionally, alignment members (97) or other structural elements can secure the components, or they can simply be adhered together at a seam (96). Indeed, the different densities of foam can be first made into one or more uncut blocks of foam. Then such multi-density foam block (95) can be cut to define the specific shape and elements as desired.

Therefore, the design and processes of manufacturing the present disclosure comprises designing the boat hull out of one or more large pieces of foam, optionally including multiple densities of foam, which are then wrapped with a reinforcing fiber and coated with resin. The foam is preferably CNC milled, though any form of cutting and shaping is acceptable, and the foam remains in the hull to add structural integrity to the hull. This particularly allows for flexibility from the customer end, to modify and change the boat dimensions and other elements within the hull itself without the need to create a new mold or to modify an existing mold. Another benefit is that some prior art designs are difficult to assemble from the mold, and thus in the present method, you would not have to go back and change the mold you would just modify the foam. In situations where foam needs to be added, foam can be sprayed into a cavity or can be separately milled and then glued or attached to the rest of the foam to modify the size or components. Indeed, even when an error has occurred, for whatever reason, using one or more internal holes (31) or latitudinally oriented holes (32), additional foam pieces can be easily secured to one another. To add a new piece, a hole could simply be added to each of opposing faces, and the two pieces adjoined. Furthermore, because of the nature of foam, simply gluing certain additional pieces of foam, or spraying new foam onto an existing foam section, can provide the necessary securing to the existing form to then recut or mill the foam to the desired shape. Once these revisions are made, the new and old foam can be covered in a reinforcement fiber and resin to create the reinforced fiber and resin layer, with the foam within. Thus, the starting process and the modification process of building the hull is highly modular and flexible.

In constructing the base foam core, the foam components can be held together in a number of different ways. For example, the components can simply be attached by securing them with resin and reinforcement fiber. However, in preferred embodiments, the pieces can be glued together first, or alignment members, rods, tubes or other securing component can be used to hold different blocks of foam together, for example, by inserting one end of the alignment member into a hole (31) and having a portion of the alignment member extending out of the hole (31) to be inserted into a corresponding hole (31) in an adjoining piece of foam, with or without adhesive at a seam. Adhesive is not always required, though it may be used in practice, as the process of adding the fiber and resin will also serve to bind the various portions of foam together. The reinforcing fibers and resin serve as key structural components of the structure. Indeed, even an alignment member need not be a portion of metal, composite, plastic, or wood, it can instead simply be reinforcing fiber and resin that adjoins the components, or a combination thereof of one or more alignment member components as well as the fiber and resin.

In a particular embodiment, a hull with multiple pieces of foam can be machined to have a unique adaptive component that matches only with one other piece of foam for the particular build. As detailed above, holes (31a and 31b) may have different diameters, different shapes, as well as different depths. Each of these holes (31a or 31b) would then have a corresponding hole in an adjoining piece of foam that matches to the diameter or shape of its pair in the first piece of foam. In this manner, for example if there were ten pieces of foam to create the hull, having specific holes in each of the ten pieces, with each adjoining piece having a specific corresponding hole. For example, a unique pair of holes (based on size, shape, or both) would allow the ten pieces of foam to only be able to be connected to one another in a single way, like a jigsaw puzzle. This allows for ease of construction and ensuring a correct orientation of the components when securing them together. Specifically, it helps to both correctly orient the various blocks and ensure a secure and good fit, reducing the misalignment of secured pieces. This then reduces the time for secondary finishing, i.e., of sanding the aligned seams to ensure a clean fit. The seams can be further modified, by machining recesses along the perimeter of each seam, to the 1/16 inch to 1 inch length, wherein the recess is easily filled with glass or resin, creating a seam that requires less secondary finishing to make the seams disappear. In preferred embodiments, each of the faces which are being adjoined, also possesses a machined recess around the face, an edge recess (103) as depicted in FIG. 7F. When securing materials without an edge recess (103), uneven bumps can be formed in glass layered over the seam. By machining the edge recess (103), even as small as 1/16 inch, around the entirety of the adjoining faces, the uneven seam bumps can be eliminated. Preferably, the edge recesses (103) are between 1/16 inch and 1 inch in width and depth.

Figure 7B:
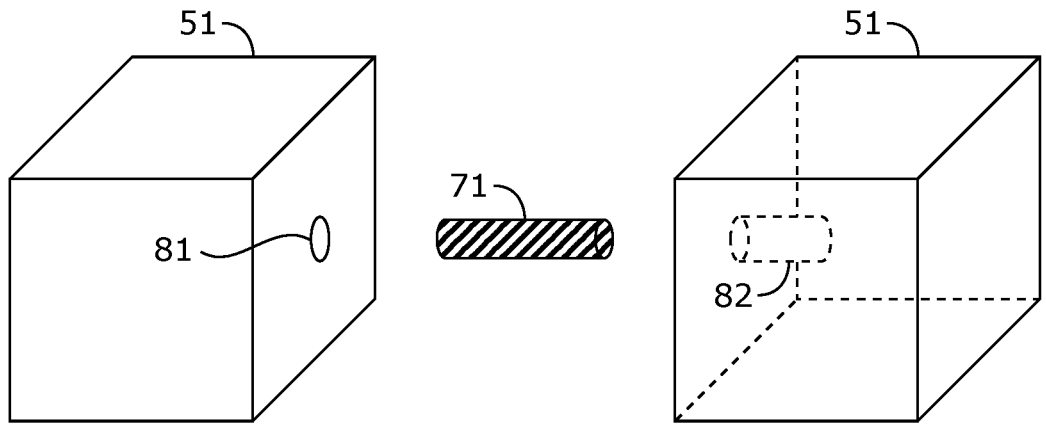
FIGS. 7B and 7C depict an embodiment when attaching the foam pieces together is the use of rods recessed into the female recesses.
Figure 7C:
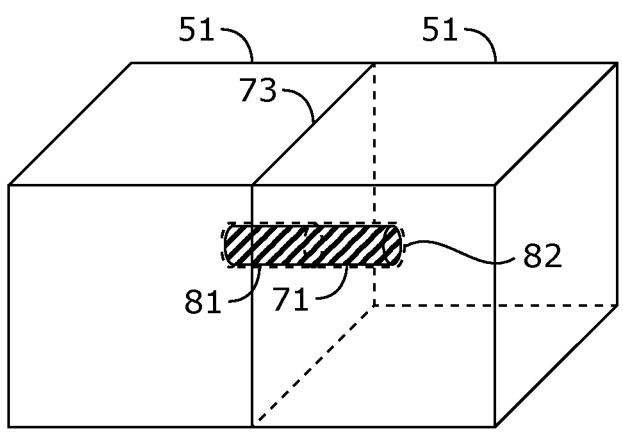

FIGS. 7B and 7C depict an embodiment when attaching the foam pieces together is the use of alignment members (71) to be recessed into the female recesses (81 and 82). In certain embodiments, the particular size of each of the recesses (81 and 82) will be the same size, and then a different pair having a different size. In this manner, the pair of recesses can be utilized to "index" the different pieces, meaning, that each component will specifically fit only with the matching component and securing them with a clean and precise fit. Thus, a recess (81 or 82) in one piece of foam will have a matching recess in another piece of foam and the depth and the diameter of the recess will particularly match to allow their connection. Notably, FIG. 7B depicts the embodiment in an exploded view, while FIG. 7C depicts an attached view, with a seam (73) between the two components. It may be appropriate to place an adhesive both on the alignment member (71) and within the recesses (81 and 82) and also on the adjoining faces, which create the seam (73) for a secure attachment.

Figure 7D:
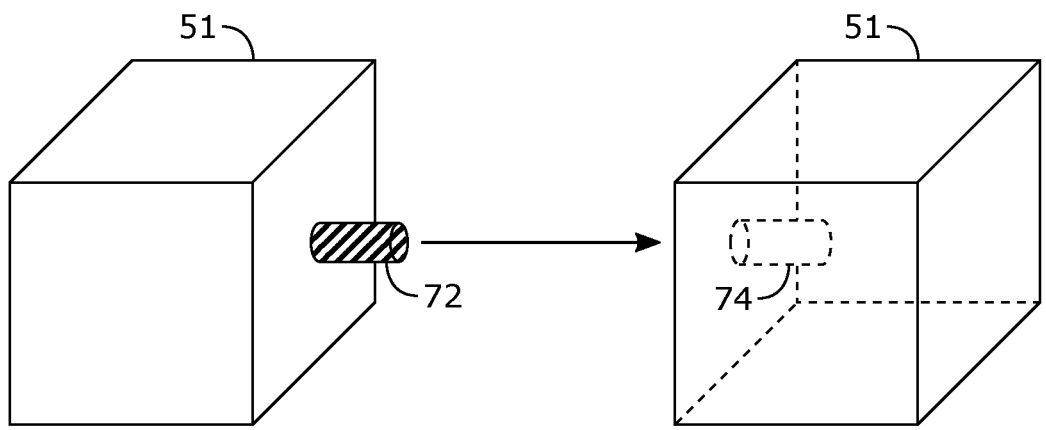
FIG. 7D depicts a further embodiment in which instead of two holes, female and male portions can be cut in the foam along aligned faces to be adjoined.

Alternatively, as depicted in FIG. 7D, instead of two holes, each aligned along a face to be adjoined, female (74) and male (72) portions can be cut in the foam. One of the faces would have the female portion, i.e., the female recess (74) as depicted, and an opposing and matching portion of the pair would have a male (72), or protruding portion that fits the size and shape of the female portion (74) with precision. Such male and female pairs may still comprise a continuous opening that runs through the entirety of the foam block to serve as a conduit for wires or hoses. Such features may replace the need to fit an alignment member (71) or other component within two female components. For example, in machining one piece, a male (72) end can be machined, and in machining a second piece a female recess (74) can be machined to allow their securing together. Alternatively, each of the first and second piece can be machined with a recess (female) and then one of the pair first filled with an alignment member (71) or other securing feature before securing into the other recess of the pair. The male member (72) may be the alignment member.

Figure 7E:
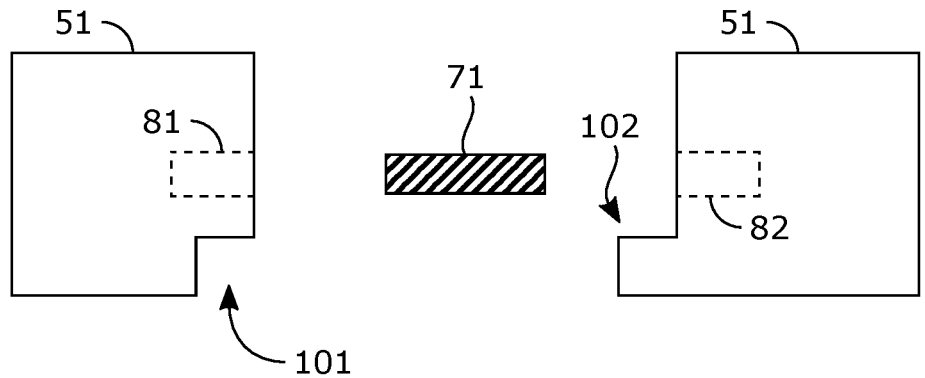
FIG. 7E depicts a lap joint being utilized between foam core pieces.
Figure 7F:
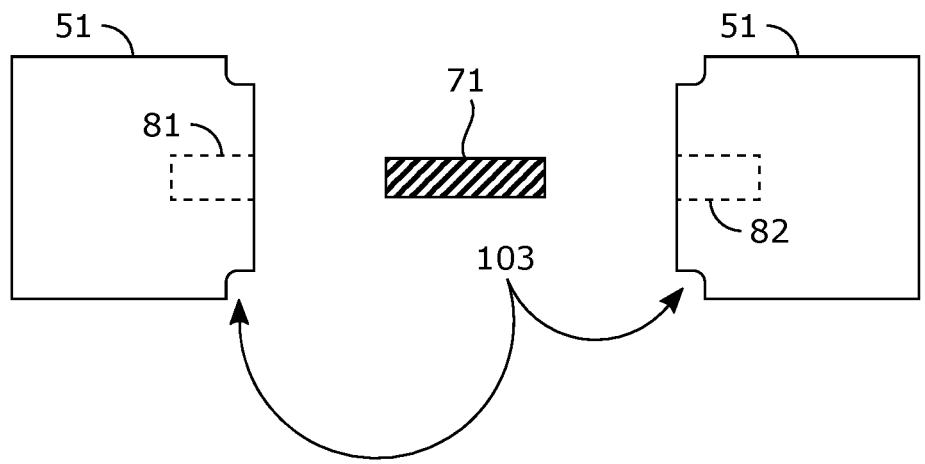
FIG. 7F depicts recesses at an edge.
Figure 7G:
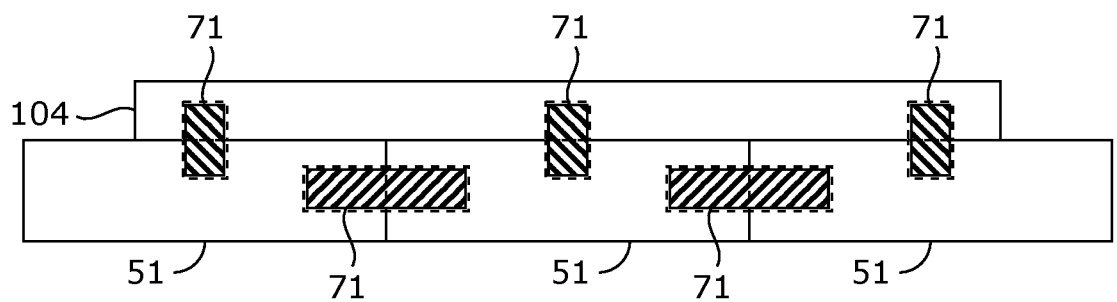
FIG. 7G depicts a top core material that supports lower seams.

FIG. 7E further depicts the use of a lap joint comprising a female portion (101) and a male portion (102). Lap joints are well known in the art for creating secure joints in woodworking and can thus be employed herein, where additional strength is desired for a given joint. Additional joining strategies may be employed as is understood by those ordinary skill in the art to increase the strength of any joint. As depicted by FIG. 7G, joints can also be further strengthened by utilizing a top core (104) portion, which secures across one or more seams in lower materials. In certain instances, vertical alignment members (71) can be utilized to orient the lower component foam blocks (51) and secure them to the top core (104). The top core material can be as simple as a layer of foam or can be additional structural elements of the boat design, built in the z-axis. Thus, the transom, or cockpit, as detailed in FIG. 5, for example, could be utilized as the top core (104) to secure and support seams of lower component foam blocks (51). A bottom core (not depicted) can also be positioned below a seam instead of above a seam.

Finally, as detailed above, foam secures to itself very well, and thus attaching of various different pieces of foam does not restrict the final iteration of the hull. Where additional material is needed or fixing an error, foam can be sprayed or attached or glued into position, recut for precision, and then finished with fiber and resin as with the remainder or the material.

Ultimately, such a structure and process for manufacturing a boat creates significant advantages, wherein the process uses ordinary materials to create a higher quality product than prior construction methods. Additionally, the process embodied by the invention does not require the building of and storage of a mold that can only be used for one particular boat design. Additionally, traditional molds are only good for a number of boats (100-400 molds) and require cleaning for each use and such waste is fully eliminated by this process. Finally, under the old process, each boat utilized a particular mold, so a 22-foot boat used a 22-foot mold and then a 25-foot mold is used to build a 25-foot mold for that boat.

The method of manufacturing a boat using the foam core as detailed herein is provided with further details below. In a nonlimiting embodiment, a 25-foot boat, having a width of 9 feet is manufactured according to the methods detailed herein. The process of manufacturing a boat hull or a structure according to the present disclosure is to first design a plan for the structure. Thus, the particular curves, cuts, and angles of the boat are designed into the plan. Once designed, one or more pieces of foam are arranged to allow for cutting of the underlying structure. Such cutting of the foam can be cut by hand, or preferably by a programmable machine, such as a CNC machine. Use of a CNC machine uses highspeed cutting elements to cut into a block of foam and create the design that was programmed into such machine. This provides a clean finish to the foam core material. As noted herein, the foam may be a single block or multiple blocks of foam that are combined together through the various attachment means detailed herein. In the particular example, the boat is made of 12 different foam pieces which then must be organized together in the proper orientation, aligned with one another to reduce post processing, and then secured together. Alignment members are thus placed within holes/recesses in each foam block and the various foam blocks are sprayed with an adhesive or cement to secure them together to yield a finished foam structure.

After the foam is finalized, glassing of the foam with a reinforcing fiber is completed. The reinforcing fiber is applied to the foam, and resin is applied or impregnated into the fiber. Together, the resin/reinforcing fiber is adhered to the underlying foam after drying. Thus, the resin and reinforcing fiber is completely backed by the foam itself. Thus, as compared to a traditional stringer system, the reinforcing fiber and resin are in direct contact with the foam instead of having areas without any backing.

Various types of fibers and resins can be utilized to create an appropriate structure. The fibers may include: woven or nonwoven fibers of natural or synthetic materials and include but are not limited to: E-Glass and S-Glass or R-Glass (names used interchangeably), carbon fiber, biaxial fibers, triaxial fibers, unidirectional fibers, aramid fibers, and combinations thereof. Some of the woven fabrics use a continuous or noncontinuous strands. Heavier weight fibers may also include untwisted yarns, and may have course finishes, as compared to smooth and clean finishes for lighter weight fibers. The fibers or cloth create structure and strong bidirectional strength. The particular fiber may use a variety of nonwoven material or utilize any number of weave patterns.

A fiber, however, cannot simply be attached to a foam core. The reinforcing fiber must be coated with and include one or more resin coats to incorporate the fibers into a finished layer. Resins include but are not limited to a polyester, vinyl ester, or epoxy resin. Most commonly, the polyester uses an orthophthalic base, but others may include isophthalic bases. In certain applications, a single layer of reinforcing fiber and resin is utilized, while in others multiple layers are utilized to create structural supporting elements. In certain embodiments, a "hot" coat may also be added as only resin over a prior layer of fiber and resin, which is often utilized to add shine or a finished look and feel. Resins, as known to those of ordinary skill in the art, often require a catalyst in various amounts to modify the rate of cure or drying of the resin material. Such materials are also often poured and then sanded to create a final finish, which may include wet or dry sanding.

In certain applications a colorant or a pigment can be added into the resin, or the underlying fiber may have a color or a design added thereto. Thus, in our example, the finished boat is requested to have a blue color. A blue fiber is utilized as a layer, which then is able to be seen through the outer transparent layer(s). This provides a blue tint to the finished boat. Many resins are transparent and thus the color will appear through thin layers of the resin. This allows the decorations or color to be hidden and protected by the exterior layer. Frequently, a gel coal is added as the outermost layer of the reinforcing fibers, which layer has excellent water repellent properties as well as abrasion resistance. Finally, within this gelcoat can include pigments or other coloring materials. This ensures that the color or pigment is sealed within the resin and/or fibers.

The choice of foam in different sections is based on the requirements of that feature. Different density foams are used for different reasons. For example, the transom (6) may utilize a stronger foam for more strength than other sections of the hull as it may be required for mounting of an outboard motor or holding an engine pan. However, alternatively, the transom can be supported with additional supports, either created through fiberglass reinforcements, or added into the foam or attached over the foam. Thus, if required, a metal plate, a plastic plate, a composite plate, or combinations thereof can be utilized to mount a motor on the transom (6) as needed for the particular application.

The use of a bilge is a necessary feature in prior art boat construction. The bilge is used to collect water leaking into the boat either from waves or through holes in the boat (i.e., drain plugs and different through hull fittings). The bilge will have a water pump to remove this excess of water from the hollow portion of the hull. The only way to keep the vast majority of boats floating is to periodically pump out the water that has collected in the bilge. In the present disclosure, the use of a bilge will not be necessary, because there is only foam and fiberglass providing positive buoyancy. Whereas in hollow boat construction, there is room for water to collect, in the boats built by the present disclosure, there is no opening and thus no place for water to collect and no way for the weight of the collected water to sink the boat. Furthermore, the foam of the present disclosure provides positive buoyancy, which can further prevent it from sinking, even where water fills some of the portions of the boat deck. Typically, strategically placed holes can then allow this water to drain without the need for a bilge pump.

In certain applications, boats may contain ballast tanks in the hull, which are filled with water to modify the buoyancy of the boat, for example to create larger wakes for wakeboarding, wake surfing or the like. Other reasons would be to make the boat more bottom heavy, and thus more stable. However, in the present embodiments, instead of impacting buoyancy as a whole, the boat can simply be manufactured with higher density foam in certain areas of the design to create a natural ballast. By creating the heavier foam at the bottom, the boat will self-right in some designs. Therefore, the invention will provide for a sizable watercraft capable of carrying multiple individuals and supporting the weight of a substantial outboard engine. Certainly, ballast tanks could still be included in the present embodiments, to further finetune the balance, especially for sport crafts, such as for wakeboarding and similar activities. These ballast tanks can be inserted into various openings machined into the foam.

Interestingly, while the boat industry is a key market for this type of construction, there are other areas that may use this form of construction to nimbly create functional structures. For example, the creation of a modular utility trailer. The trailer would be a multiuse custom solution that would be applicable across multiple types of vehicles. The idea is to have a single "base" size and modify the structure based upon the precise length of the vehicle or the desired size of the structure. The structure can then be refined by simply reducing or enlarging the size of the features within a CNC machine. For example, if a structure was designed at a first size, if the new structure is smaller, the total size can be reduced by a number, for example, by 10%, which would reduce the size of all features within. Similarly, enlargement would take a base design and increase the size by a percentage. This would take the form of a traditional flatbed single or tandem axle trailer that could then be easily modified to fit different sizes and goals of the consumer.

Additional examples may include a pond structure, a pool structure, fiberglass car and truck components, drone bodies, propellers, or another design element that can be designed in this manner. Those of ordinary skill in the art will recognize that the use of a foam core or foam block are useful where traditional stringer construction is utilized and covered with fiberglass and resin. In such construction, the present disclosure generates a structure with greater strength than prior art methods as well as generating a highly flexible method of creating the same.

What is claimed is:

1. A method of manufacturing a boat hull comprising:
   a. forming a foam mold of a predetermined shape and size from one or more pieces of foam;
   b. cutting into said foam mold at least one C-channel running in a longitudinal or lateral direction within the foam wherein said at least one C-channel has a depth of between 1 mm and 100 mm; and
   c. coating said foam mold with at least one layer of reinforcing fiber and resin wherein said reinforcing fiber is positioned within the C-channel and in direct contact with the foam within said C-channel.

2. The method of claim 1 wherein said foam mold comprises at least two pieces of foam.

3. The method of claim 2 wherein the at least two pieces of foam comprise a first piece of foam of a first density and a second piece of foam of a second density.

4. The method of claim 1 wherein at least one piece of foam comprises at least two different densities of foam wherein a higher density foam is positioned below a lower density foam.

5. The method of claim 1 wherein said at least one C-channel runs in a longitudinal axis in the foam and extends between 5% and 90% of the length of the foam.

6. The method of claim 1 comprising at least two C-channels, each running in a longitudinal axis.

7. The method of claim 1 wherein the at least one C-channel comprises a tube, a pipe, a wire, or a structural element running along at least a portion of the length of the C-channel.

8. The method of claim 1 further comprising a through hole positioned within said foam.

9. The method of claim 1 wherein a conduit provides a passage between a first point in said boat hull and a second point in said boat hull and preferably wherein the conduit is positioned within a through hole within said foam.

10. The method of claim 1 further comprising a first piece of foam and a first aligned recess and a second piece of foam and a second aligned recess wherein said first and second aligned recesses are oriented to align said first and second pieces of foam by inserting an alignment member within said first and second aligned recesses.

11. The method of claim 10 wherein the first and second aligned recesses are first and second through holes, said through holes providing continuous connection between said first and second through holes.

12. The method of claim 11 wherein said first through hole and said second through hole have the same diameter.

13. The method of claim 1 further comprising a plurality of pieces of foam, each piece of foam comprising at least one adjacent piece of foam; wherein a connection pair of holes is defined to secure each at least one adjacent piece of foam to another; and wherein an alignment member is positioned between each adjacent piece of foam.

14. The method of claim 13 wherein the connection pair of holes is defined so that each pair has a unique diameter or a unique shape so as to form a unique pair as compared to all other connection pairs of holes.

15. The method of claim 1 further comprising a higher density foam positioned below a lower density foam within the foam mold.

16. The method of claim 1 wherein said reinforcing fiber is a woven or nonwoven fiber of natural or synthetic materials and includes but is not limited to: E-Glass and S-Glass or R-Glass, carbon fiber, biaxial fibers, triaxial fibers, unidirectional fibers, aramid fibers, and combinations thereof; wherein said reinforcing fiber is compatible with one or more resins, said one or more resins selected from the group consisting of: polyester, vinyl ester, epoxy resin, and combinations thereof.

17. The method of claim 1 wherein a seam created between a face on a first piece of foam and a second face on a second piece of foam comprises a recess at an edge of the face and the second face along the length of the seam.

18. A method of manufacturing a boat hull comprising:
   a. forming a foam mold of a predetermined shape and size from at least a first piece of foam and a second piece of foam, each comprising at least one face for being adjoined together;

b. securing said first and second pieces of foam with an alignment member, said alignment member being positioned within a first hole in said first piece of foam and a second hole in said second piece of foam, said first and said second holes positioned on opposing faces being adjoined;

c. coating said foam mold with at least one layer of reinforcing fiber and resin; and performing one or more of the following steps before coating:

i. cutting into said foam mold at least one C-channel running in a longitudinal or lateral direction within the foam; and/or ii. placing a hose or wire within the first or second hole; and/or iii. the alignment member being hollow; and/or iv. the first or second piece of foam comprising at least two different densities of foam; and/or v. a top core material being positioned above a seam between the first and second pieces of foam; and/or vi. a recess being positioned along each of the adjoining faces; and/or vii. a hose or wire being provided within a C-channel.

19. A boat hull comprising:

a. a foam core, said foam core comprising at least a first piece of foam and a second piece of foam;

b. at least one alignment member positioned between said first and second pieces of foam;

c. a C-channel positioned on a face of at least one of the first and second piece of foam;

d. at least one of a conduit, a tube, a hose, or a wire positioned within the C-channel; and e. at least one layer of fiber impregnated with resin, said at least one layer of fiber impregnated with resin suitable for covering the foam core.

\* \* \* \* \*